(12) United States Patent
Kosaka

(10) Patent No.: US 12,148,234 B2
(45) Date of Patent: Nov. 19, 2024

(54) INFORMATION PROCESSING WITH ITERATIVELY IMPROVED ESTIMATES OF DATA ATTRIBUTES BASED ON USER MODIFICATIONS, AND APPARATUS, METHOD, AND STORAGE MEDIUM THEREOF

(71) Applicant: CANON KABUSHIKI KAISHA, Tokyo (JP)

(72) Inventor: Ryo Kosaka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 436 days.

(21) Appl. No.: 17/552,352

(22) Filed: Dec. 15, 2021

(65) Prior Publication Data

US 2022/0207900 A1 Jun. 30, 2022

(30) Foreign Application Priority Data

Dec. 24, 2020 (JP) ................. 2020-215546

(51) Int. Cl.
*G06V 30/414* (2022.01)
*G06V 30/148* (2022.01)
*G06V 30/412* (2022.01)

(52) U.S. Cl.
CPC .......... *G06V 30/414* (2022.01); *G06V 30/153* (2022.01); *G06V 30/412* (2022.01)

(58) Field of Classification Search
CPC .... G06V 30/10; G06V 30/414; G06V 30/412; G06V 30/413; G06V 30/416; G06V 30/40; G06V 30/153; G06V 30/1448; G06V 30/418; G06V 10/82; G06V 30/148; H04N 1/00331; H04N 2201/0094; G06F 18/214; G06F 16/93; G06F 16/5846; G06F 16/90344; G06F 18/21; G06N 3/08;
(Continued)

(56) References Cited

U.S. PATENT DOCUMENTS 8,514,462 B2 8/2013 Sohma et al. ................ 358/448
8,548,240 B2 10/2013 Kanatsu et al. .............. 382/173
(Continued)

FOREIGN PATENT DOCUMENTS

JP 2006293917 A * 10/2006
JP 2019153919 A * 9/2019
(Continued)

*Primary Examiner* — Chan S Park
*Assistant Examiner* — Woo C Rhim
(74) *Attorney, Agent, or Firm* — Venable LLP

(57) ABSTRACT

Processing of an image obtained by scanning an original document and on which character recognition processing is executed on text blocks which are extracted from the scanned image. The text blocks indicate regions of character attributes which may have different data attributes. An estimate is made of the likelihood that a text block is associated with a predetermined data attribute, and a display is made of the scanned image and the character string included in the estimated text block. If the displayed character string is modified by a user, reference information is updated based on the modified character string and history information pertaining to the modification is displayed. The updated reference information is used to improve the estimate of the likelihood that the text block is associated with the predetermined data attribute.

7 Claims, 13 Drawing Sheets

(58) Field of Classification Search
CPC .............. G06N 20/00; G06T 1/0007; G06T 2207/20081; G06T 2207/20084; G06T 2207/30176
See application file for complete search history.

(56) References Cited

U.S. PATENT DOCUMENTS

| | | | |
|---|---|---|---|
| 2007/0206884 A1* | 9/2007 | Kato | G06V 30/262 |
| | | | 382/229 |
| 2012/0008174 A1* | 1/2012 | Sohma | G06V 30/422 |
| | | | 358/448 |
| 2014/0223544 A1* | 8/2014 | Yoshida | G06F 21/31 |
| | | | 726/16 |
| 2016/0227066 A1* | 8/2016 | Shimazaki | G06V 30/412 |
| 2017/0249526 A1* | 8/2017 | Kawasaki | G06V 30/147 |
| 2018/0349693 A1* | 12/2018 | Watanabe | G06V 30/414 |
| 2019/0087444 A1* | 3/2019 | Arakawa | H04N 1/4074 |
| 2019/0303702 A1* | 10/2019 | Collet | G06N 20/00 |
| 2019/0362143 A1* | 11/2019 | Nakamura | G06V 30/416 |
| 2020/0202173 A1* | 6/2020 | Oishi | G06V 30/19173 |
| 2020/0265265 A1* | 8/2020 | Yoshizuka | G06F 18/28 |
| 2020/0314250 A1* | 10/2020 | Kobayashi | H04N 1/00331 |
| 2021/0012104 A1* | 1/2021 | Kondoh | G06V 30/413 |
| 2021/0110149 A1* | 4/2021 | Yoshizuka | G06F 16/93 |
| 2022/0188543 A1* | 6/2022 | Tatsumi | G06V 30/41 |

FOREIGN PATENT DOCUMENTS

| | | | |
|---|---|---|---|
| JP | 2019169026 A | * | 10/2019 |
| JP | 2020-027524 | | 2/2020 |
| WO | WO-2021059848 A1 | * | 4/2021 |

* cited by examiner

IIIB — 300

BILL 213-0032  
1-1-1, ○○, TAKATSU WARD, KAWASAKI CITY,  
KANAGAWA PREFECTURE

DEAR TAMAGAWA △△ COMPANY LIMITED

NO : 123-4567  
ISSUE DATE: 12/1/2016  
□□INK CO. LTD.,

DUE DATE FOR PAYMENT     12/15/2016  
AMOUNT BILLED     202,230 YEN

| ITEM | UNIT PRICE | QUANTITY | AMOUNT |
|---|---|---|---|
| GF-C157 A3 (200 PIECES × 3 BOOKS/BOX) | 11550 | 3 | 34,650 |
| EF24-70mm F4L IS USM | 134100 | 1 | 134,100 |
| OFFICE 70 A4 (500 PIECES × 5 BOOKS/BOX) | 3000 | 2 | 6,000 |
| TONER CARTRIDGE (MAGENTA) | 12500 | 1 | 12,500 |

SUB TOTAL     ¥187,250  
TAX RATE 8%   CONSUMPTION TAX     ¥14,980  
               TOTAL     ¥202,230

THE TRANSFER FEE WOULD BE BORNE BY YOU.

○○△△BANK HIGASHI-TOTSUKA BRANCH  
SAVINGS ACCOUNT     123-4567890  
ACCOUNT HOLDER NAME   YAKO TARO

□□INK COMPANY LIMITED  
321-3292  
3-451, ○×△, KAWASAKI CITY, KANAGAWA PREFECTURE  
TEL :+81-3-3758-○○○△  
FAX:+81-3-3758-○○○□

FIG.3A

| ID | CHARACTER STRING |
|---|---|
| A | BILL |
| B | NO: 123-4567 |
| C | ISSUE DATE: 12/1/2016 |
| D | 213-0032 |
| E | 1-1-1, ○○, TAKATSU WARD, KAWASAKI CITY, KANAGAWA PREFECTURE |
| F | TAMAGAWA△△ COMPANY, LIMITED |
| G | DEAR |
| H | □□INK CO. LTD., |
| I | DUE DATE FOR PAYMENT |
| J | 12/15/2016 |
| K | AMOUNT BILLED |
| L | 202,230 YEN |

| DATA ATTRIBUTE | WORD | FREQUENCY |
|---|---|---|
| TOTAL AMOUNT | ¥ | 328 |
|  | , | 292 |
|  | YEN | 162 |
|  | ... | ... |
| BILL NUMBER | : | 130 |
|  | NUMBER | 28 |
|  | BILL | 25 |
|  | ... | ... |
| ... | ... | ... |

410

| DATA ATTRIBUTE | DATA TYPE | FREQUENCY |
|---|---|---|
| TOTAL AMOUNT | ¥¥d+,¥d+ | 275 |
|  | ¥¥d+,¥d+,¥d+ | 103 |
|  | ¥d+,¥d+YEN | 84 |
|  | ... | ... |
| BILL NUMBER | [A-Z]:¥¥d+-¥d+ | 43 |
|  | BILL[A-Z]+¥d+NUMBER | 16 |
|  | ¥d+NUMBER | 12 |
|  | ... | ... |
| ... | ... | ... |

420

| FEATURE TYPE | DATA ATTRIBUTE | TYPE | SCORE |
|---|---|---|---|
| TARGET CHARACTER STRING | TOTAL AMOUNT | WORD | 1.38 |
| | | DATA TYPE | 0.31 |
| | BILL NUMBER | WORD | 0.00 |
| | | DATA TYPE | 0.00 |
| | ... | ... | ... |
| PROXIMITY CHARACTER STRING | TOTAL AMOUNT | WORD | 1.99 |
| | ... | DATA TYPE | 0.12 |
| | ... | ... | ... |
| REGION FEATURE | x / PageSize | | 0.61 |
| | y / PageSize | | 0.41 |

| ID | CHARACTER STRING | DATA ATTRIBUTE CANDIDATE | | | | ESTIMATED DATA ATTRIBUTE |
|---|---|---|---|---|---|---|
| | | (NON-ATTRIBUTE VALUE) | BILL NUMBER | TOTAL AMOUNT | ISSUER | |
| ... | ... | ... | ... | ... | ... | ... |
| F | TAMAGAWA△△ COMPANY LIMITED | 0.8 | | | 0.29 | – |
| G | DEAR | 0.88 | | | 0.12 | – |
| H | □□INK CO. LTD., | 0.02 | | | 0.78 | ISSUER |
| ... | ... | ... | ... | ... | ... | ... |
| K | AMOUNT BILLED | 0.93 | | | 0.07 | – |
| L | 202,230 YEN | | 0.10 | 0.73 | | TOTAL AMOUNT |
| ... | ... | ... | ... | ... | ... | ... |

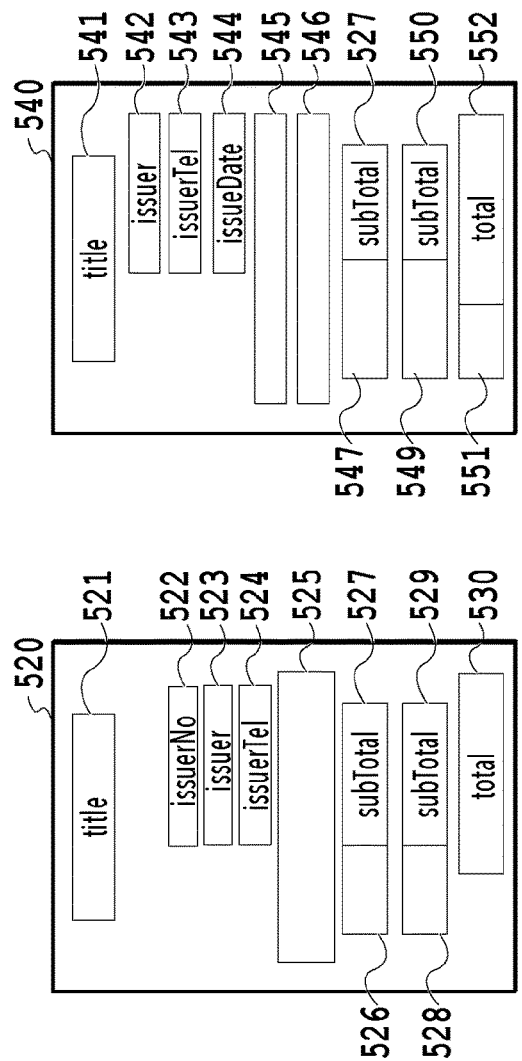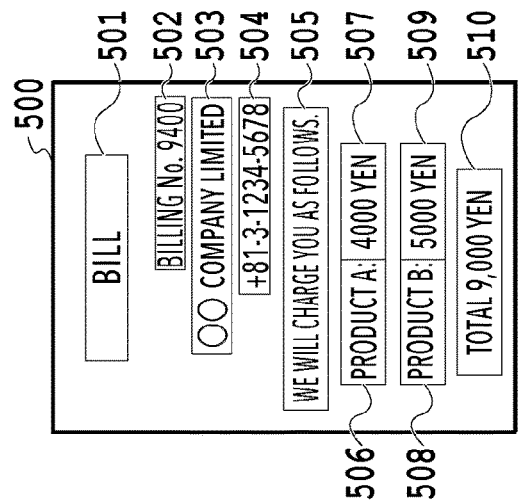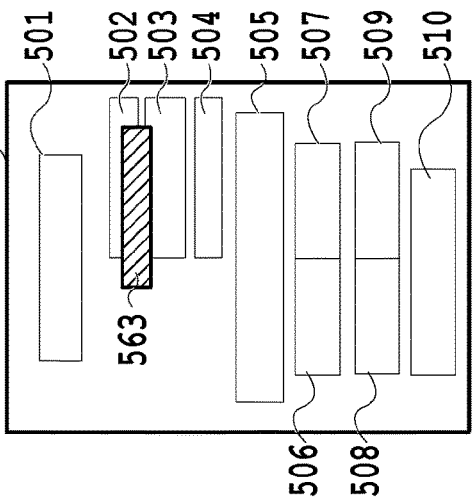

BILL 213-0032  
1-1-1, ○○, TAKATSU WARD, KAWASAKI CITY, KANAGAWA PREFECTURE

DEAR TAMAGAWA △△ COMPANY LIMITED

NO : 123-4567  
ISSUE DATE: 12/1/2016 — 803  
□□INK CO. LTD.,

DUE DATE FOR PAYMENT   12/15/2016 — 801  
AMOUNT BILLED   202,230 YEN

| ITEM | UNIT PRICE | QUANTITY | AMOUNT |
|---|---|---|---|
| GF-C157 A3 (200 PIECES × 3 BOOKS/BOX) | 11550 | 3 | 34,650 |
| EF24-70mm F4L IS USM | 134100 | 1 | 134,100 |
| OFFICE 70 A4 (500 PIECES × 5 BOOKS/BOX) | 3000 | 2 | 6,000 |
| TONER CARTRIDGE (MAGENTA) | 12500 | 1 | 12,500 |

TAX RATE 8%  
SUB TOTAL ¥187,250 — 802  
CONSUMPTION TAX ¥14,980  
TOTAL ¥202,230

THE TRANSFER FEE WOULD BE BORNE BY YOU.  
PLEASE CONTACT PERSON IN CHARGE OF □□ INK CO. LTD., FOR ANY INQUIRY. — 804

○○△△BANK HIGASHI-TOTSUKA BRANCH  
SAVINGS ACCOUNT   123-4567890  
ACCOUNT HOLDER NAME   YAKO TARO

— 805  
□□INK COMPANY LIMITED  
321-3292  
3-451, ○×△, KAWASAKI CITY, KANAGAWA PREFECTURE  
TEL :+81-3-3758-○○○△  
FAX:+81-3-3758-○○○□

FIG.8A

| CHARACTER STRING | NORMALIZED CHARACTER STRING |
|---|---|
| COMPANY LIMITED | COMPANY LIMITED |
| CO. LTD., | |
| CO. LTD.,) | |
| (CO. LTD.,) | |
| ¥00,000 | ¥00,000 |
| 00,000 YEN | |
| ⋮ | ⋮ |

FIG.8B

| ID | OCR CHARACTER STRING | NORMALIZED CHARACTER STRING |
|---|---|---|
| 801 | 202,230 YEN | ¥202,230 |
| 802 | ¥202,230 | ¥202,230 |
| 803 | □□INK CO. LTD., | □□INK COMPANY LIMITED |
| 804 | □□INK CO. LTD., | □□INK COMPANY LIMITED |
| 805 | □□INK COMPANY LIMITED | □□INK COMPANY LIMITED |

INFORMATION PROCESSING WITH ITERATIVELY IMPROVED ESTIMATES OF DATA ATTRIBUTES BASED ON USER MODIFICATIONS, AND APPARATUS, METHOD, AND STORAGE MEDIUM THEREOF

BACKGROUND OF THE INVENTION

Field of the Invention

The present disclosure relates to a technique of setting information related to a scanned image obtained by scanning.

Description of the Related Art

In recent years, the computerization of documents handled in business has been advanced. In the computerization of documents, enormous pieces of form paper handled are identified to define their types so as to execute processing on each type of form paper in accordance with the workflow. For example, information on predetermined data attributes (form name, form number, issuer company information, issue date, billed contents, and the like) is extracted from the identified form paper, and the data is registered in a predetermined business system such as an account processing system and an expense adjustment system.

In order to reduce manual inputs in such a data registration operation, there has been a method of automatically extracting a data attribute and an item value in a form. For example, there has been an extraction method using a learning model that has learned a position in which a character string as an item value is described and a description rule of a character string and a proximity character string. Japanese Patent Laid-Open No. 2020-27524 discloses a method of outputting a character region (item value region) and a type of the region (data attribute) in a form by means of an image recognition model and performing the character recognition on the thus-outputted character region to output a character string (item value). In order to increase the number of forms that can be estimated in such a method of making an estimation by means of a learning model, the learning model needs to learn various description rules and appearance patterns.

However, in order to achieve the learning of various description rules and appearance patterns in Japanese Patent Laid-Open No. 2020-27524, it is required to increase the number of item value regions associated with each data attribute, and a user needs to individually designate those item value regions. This has caused a problem that the operation is considerably troublesome.

SUMMARY OF THE INVENTION

A technique of the present disclosure is an information processing apparatus including: an obtainment unit configured to obtain a scanned image obtained by scanning an original document; a character recognition unit configured to extract text blocks indicating regions of character attributes from the scanned image and executes character recognition processing on the extracted text blocks; an estimation unit configured to estimate a text block including a character string associated with a predetermined data attribute out of the text blocks by using reference information; and an update unit configured to update the reference information such that the estimation unit is able to estimate a text block including a character string matching a character string included in the estimated text block out of text blocks other than the estimated text block as a text block including a character string associated with the predetermined data attribute.

Further features of the present invention will become apparent from the following description of exemplary embodiments with reference to the attached drawings.

BRIEF DESCRIPTION OF THE DRAWINGS

FIG. 3A is a diagram illustrating an example of an input image and results of text block extraction processing and OCR processing;

FIG. 4C is a diagram illustrating an example of the item value estimation processing by means of the item value estimation model;

FIG. 4D is a diagram illustrating an example of the item value estimation processing by means of the item value estimation model;

FIG. 5A is a diagram illustrating an example of item value estimation processing by means of image matching processing;

FIG. 5B is a diagram illustrating an example of the item value estimation processing by means of the image matching processing;

FIG. 5C is a diagram illustrating an example of the item value estimation processing by means of the image matching processing;

FIG. 5D is a diagram illustrating an example of the item value estimation processing by means of the image matching processing;

FIG. 5E is a diagram illustrating an example of the item value estimation processing by means of the image matching processing;

FIG. 6A is a diagram illustrating an example of a UI screen display for confirmation/modification of the correspondence relationship between a data attribute and an item value;

FIG. 6B is a diagram illustrating an example of the UI screen display for confirmation/modification of the correspondence relationship between the data attribute and the item value;

FIG. 8A is a diagram illustrating an example of a result of conversion processing of character strings into a uniform expression in a second embodiment;

FIG. 8B is a diagram illustrating an example of a result of the conversion processing of character strings into a uniform expression in the second embodiment;

FIG. 8C is a diagram illustrating an example of a result of the conversion processing of character strings into a uniform expression in the second embodiment;

FIG. 9 is a diagram illustrating an example of the UI screen display in a third embodiment.

DESCRIPTION OF THE EMBODIMENTS

Embodiments of a technique of the present disclosure are described below with reference to the drawings. Note that, the constituents described in the embodiments are merely examples and are not intended to limit the scope of the technique of the present disclosure thereto.

First Embodiment

<Data Input Assistance System>

Figure 1:
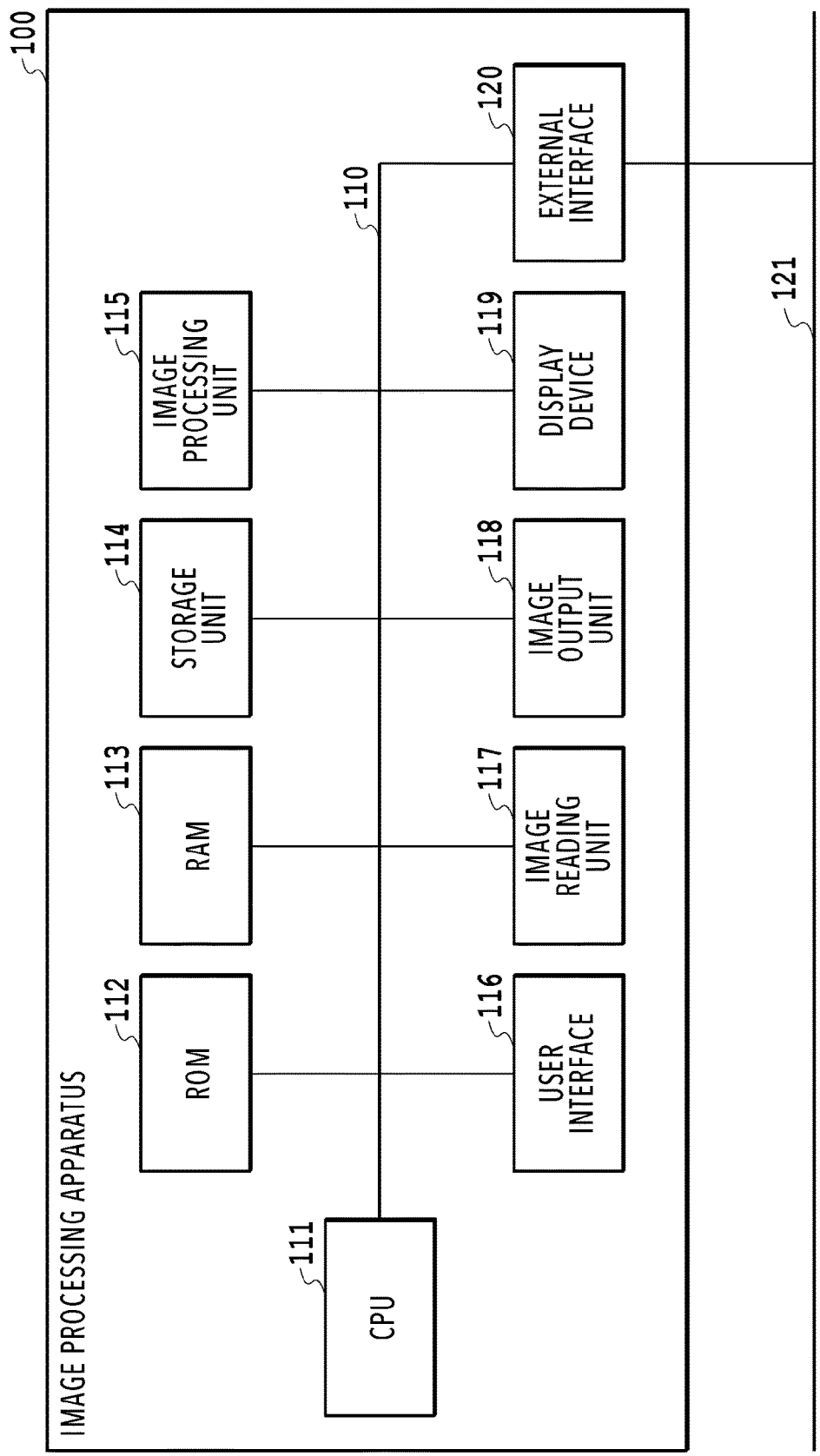
FIG. 1 is a block diagram illustrating an example of a hardware configuration of an image processing apparatus in a technique of the present disclosure.

FIG. 1 is an example of a block diagram illustrating a configuration of a data input assistance system that is implemented by an image processing apparatus 100. The data input assistance system herein is to automatically extract item values including character strings that are associated with all data attributes required in a predetermined business system from a form image, which is an image of a scanned original document, so as to assist processing of transmitting the item values to the predetermined business system.

As illustrated in FIG. 1, the image processing apparatus 100 includes a CPU 111, a ROM 112, a RAM 113, a storage unit 114, an image processing unit 115, a user interface 116, an image reading unit 117, an image output unit 118, and a display device 119. The devices are inter-communicably connected through a data bus 110. The image processing apparatus 100 is connected to a not-illustrated external information processing apparatus, cloud system, business system, and the like through a network 121 by way of an external interface 120.

The CPU 111 is a controller base to control overall the image processing apparatus 100. The CPU 111 activates an operating system (OS) by a boot program stored in the ROM 112. On this OS, a controller program stored in the storage unit 114 is executed. The controller program is a program to control the image processing apparatus 100. The CPU 111 controls overall the devices connected with each other through the data bus 110. The RAM 113 operates as a main memory of the CPU 111 and a temporal storage region such as a working area.

The storage unit 114 is a non-volatile memory such as an HDD that is capable of reading and writing and stores various data such as the above-described controller program and processing results.

The image processing unit 115 analyses a scanned image such as a form stored on the storage unit 114 and generates information to assist data input. The analysis processing includes the following four types of processing. The first processing is block selection processing (BS processing) to extract a text block as a region having a character attribute in a form image. The second processing is optical character recognition processing (OCR processing) to extract a character string from a character string image extracted as the text block. The third processing is processing that uses an item value estimation unit to extract from the extracted character string a character string as an item value associated with a data attribute (for example, form name and form identification number (form number), billing company information, billed amount, and the like) required for input to various business systems. The fourth processing is processing of updating the item value estimation unit that extracts an item value in response to a feedback result from a user.

The user interface 116 is an input and output device including, for example, a keyboard, a mouse, a touch panel, a hard key, and the like. The user interface 116 receives various setting values or designated values from the user and transfers instruction information to the CPU 111.

The image reading unit 117 is a scanner device that can obtain a scanned image in the form of image data by reading a paper document and the like by using an optical reading device such as a CCD. Once obtaining the scanned image from the image reading unit 117, the CPU 111 stores the scanned image into the storage unit 114.

The image output unit 118 is a printer device that can, for example, execute processing of outputting image data according to the scanned image to a storage medium. Otherwise, the image output unit 118 may have a printing function and execute processing of outputting the scanned image to an output medium such as a paper medium.

The display device 119 is a display apparatus such as an LCD or a CRT that is display-controlled by the CPU 111 and displays display data generated by the CPU 111.

The external interface 120 transmits and receives various data such as the image data and the extracted form information to and from an external device through the network 121 including a LAN, a phone line, and an infrared communication such as a near field wireless communication.

The image processing apparatus 100 described above is an example and may be an information processing apparatus having a configuration without any one of the image reading unit 117, the image output unit 118, and the display device 119. In this case, the configuration may allow the information processing apparatus to inter-communicate the necessary information with any one of an external image reading unit, image output unit, and display device through the external interface 120. Some of the functions of the image processing apparatus 100 may be executed by an external processing apparatus through the inter-communication using the external interface 120. The external processing apparatus may be implemented by a computer apparatus such as a server or may be implemented by a cloud server on the Internet. Additionally, the image processing apparatus 100 may have other configurations according to the needs.

Figure 10:
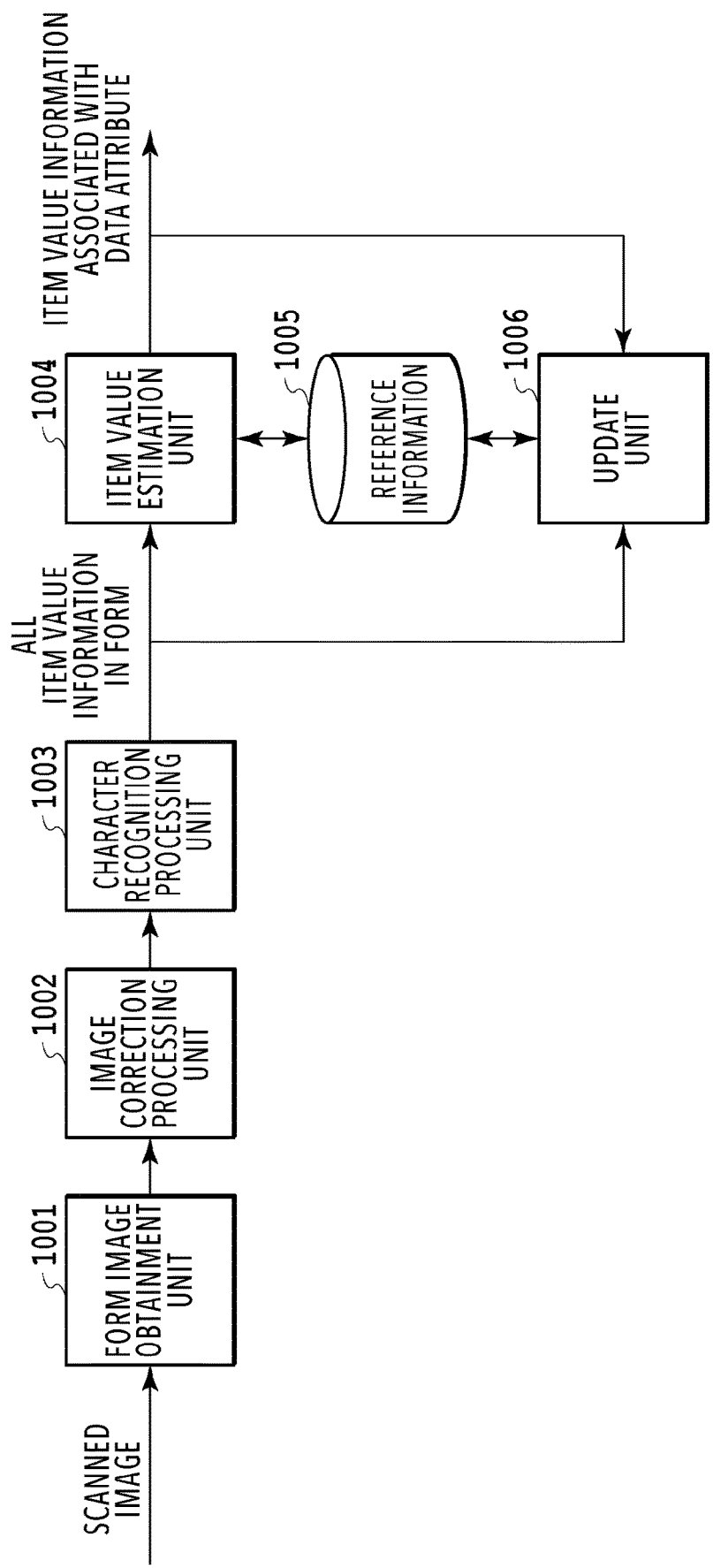
FIG. 10 is a block diagram illustrating an example of a software configuration of the image processing apparatus in the technique of the present disclosure.

FIG. 10 is a block diagram illustrating an example of a software configuration of the image processing apparatus in the present disclosure. This software configuration is implemented with the CPU 111 and the image processing unit 115 executing the program stored in the storage unit 114.

A form image obtainment unit 1001 obtains a form image that is obtained by scanning a form by the image reading unit 117 or an external processing apparatus.

An image correction processing unit 1002 executes image correction processing and rotational correction processing on the form image obtained by the form image obtainment unit 1001.

A character recognition processing unit 1003 executes text block extraction processing and OCR processing on the form image corrected by the image correction processing unit 1002 and obtains positions of all text blocks in the form image and character strings (item value information) included in the text blocks.

Based on reference information 1005, an item value estimation unit 1004 estimates item value information that is associated with a predetermined data attribute out of the item value information obtained by the character recognition processing unit 1003. The item value estimation unit 1004 executes item value estimation processing by means of an item value estimation model that has learned character string feature amount or executes item value estimation processing by means of image matching processing with a registered image. In the item value estimation processing by means of the item value estimation model, the reference information 1005 is the character string feature amount, but in the item value estimation processing by means of the image matching processing, the reference information 1005 is the registered image. Details of the item value estimation processing are described later with reference to FIGS. 4A to 4D and 5A to 5E.

An update unit 1006 updates the reference information 1005 based on the item value information obtained by the character recognition processing unit 1003 and the result estimated by the item value estimation unit 1004. Details of the reference information update processing are described later with reference to FIG. 7.

<Entire Processing Flow>

Figure 2:
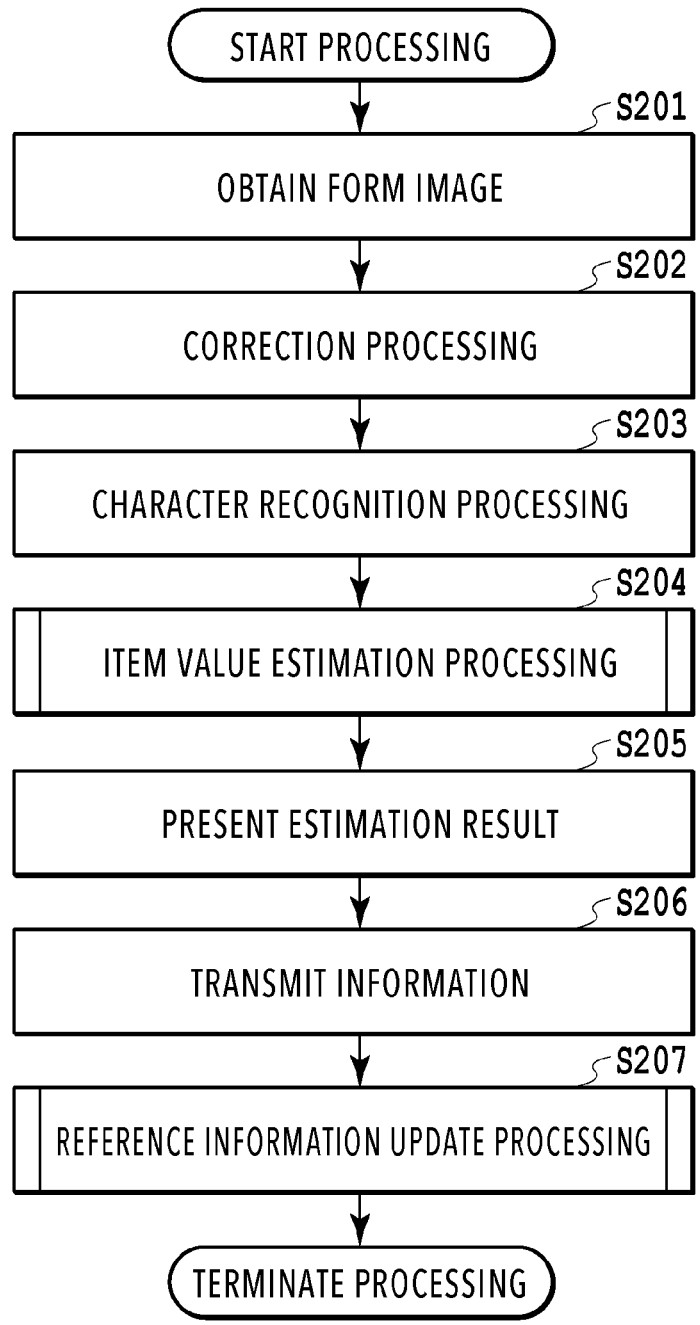
FIG. 2 is a diagram illustrating an example of an entire flow in the image processing apparatus in the technique of the present disclosure.

Next, a processing flow of this embodiment is described with reference to FIG. 2. FIG. 2 is a flowchart indicating an entire processing flow of the data input assistance system that is executed in the image processing apparatus 100 on a scanned image (form image) of a form newly obtained by scanning or a form image received through the external interface 120. The processing flow indicated in FIG. 2 is started when the user interface 116 of the user receives an instruction to scan a form from the user or receives a scanned image of a form. In this process, the CPU 111 may hold information on the name of the user who starts the processing in the RAM 113. The user name can be obtained by using a not-illustrated authentication device or the like. The processing included in the processing flow indicated in FIG. 2 is executed by the CPU 111 with a program code stored in the storage unit 114 being deployed into the RAM 113.

In S201, the form image obtainment unit 1001 obtains the form image saved in the storage unit 114. This form image is a scanned image obtained by the scanning by the image reading unit 117 or a scanned image of a form received through the external interface 120.

In S202, the image correction processing unit 1002 reads out the form image saved in the storage unit 114 to the RAM 113 and executes the image correction processing and the rotational correction processing on the form image. The image correction processing executes correction processing for a form image such as color conversion processing, gradation correction, and noise removal. The rotational correction processing executes processing of rotating an image by using a rotation angle that is calculated based on the property that character strings and lines in a digital form image are aligned in a horizontal direction.

Figures 3B, 3C:
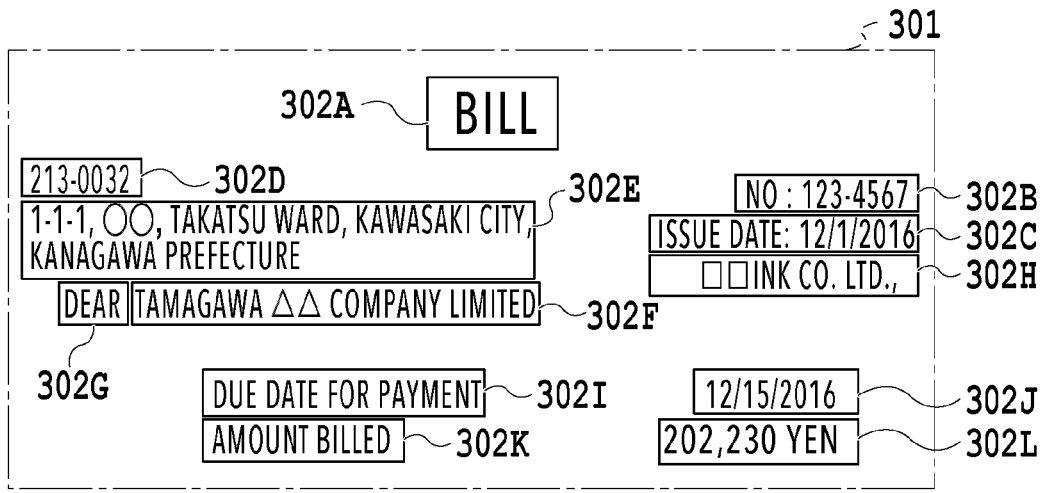
FIG. 3B is a diagram illustrating an example of the input image and the results of the text block extraction processing and the OCR processing.
FIG. 3C is a diagram illustrating an example of the input image and the results of the text block extraction processing and the OCR processing.

In S203, the character recognition processing unit 1003 executes the text block extraction processing and the OCR processing on the form image corrected in S202. FIGS. 3A to 3C illustrate an example of the form image and the results of the text block extraction processing and the OCR processing. FIG. 3A is a form image 300 obtained in S201. With the execution of the text block extraction processing and the OCR processing, the positions of the text blocks and the character strings (item value information) included in the text blocks are extracted from the form image 300. FIG. 3B is an enlarged view of a region 301 in the form image 300. Text blocks 302A to 302L are extracted from the partial region 301, and a character string in each text block is extracted as illustrated in FIG. 3C.

In S204, the item value estimation unit 1004 executes the item value estimation processing. The item value estimation processing is processing of estimating that where is an item value associated with each data attribute as an extraction target described in the form image based on the reference information 1005 including a description rule, an appearance pattern, and the like of an item value that is learned or registered. The item value estimation processing is described later with reference to FIGS. 4A to 4D and 5A to 5E.

In S205, the item value estimation unit 1004 displays a confirmation screen for the estimation result of the item value on the display device 119. The user then performs a confirmation and modification operation of the character string as the item value presented as the estimation result by watching this confirmation screen. The confirmation screen for the estimation result of the item value and the confirmation/modification operation by the user are described later with reference to FIGS. 6A and 6B.

In S206, the item value estimation unit 1004 transmits information required for the registration into a predetermined business system through the external interface 120. An example of the information to be transmitted includes information on the data attribute and the item value that are confirmed and modified by the user in S205. The information to be transmitted is not limited thereto and may include a scanned image and scanning information (scanning date information, scanning setting information, and the like) of a form obtained by scanning, or a received form image and transmission and reception information (transmission and reception date information, transmission destination information, and the like). Additionally, needless to say, the information may include information on a user who performs the scanning operation or the confirmation/modification operation, for example.

Finally, in S207, in response to the result of the confirmation/modification operation by the user in S205, the update unit 1006 executes the reference information update processing. The reference information update processing is processing of generating learning data or a registered image associated with the data attribute and the item value information (a character string as the item value and the described position of the item value) based on information on the confirmation/modification by the user and updating the reference information used in S204. The reference information update processing is described later with reference to FIG. 7. The described position of the item value is a position of an item value region that is a region in which the item value on the scanned image is described.

<Item Value Estimation Processing>

The item value estimation processing executed in S204 in FIG. 2 is described with reference to FIGS. 4A to 4D and 5A to 5E. FIGS. 4A to 4D are diagrams describing processing of estimating an item value associated with a predetermined data attribute based on the item value estimation model that has learned from the data attributes and the item value information and a character string proximal to the item value. FIGS. 5A to 5E are diagrams describing processing of registering in advance a form image that is associated with a predetermined data attribute corresponding to the item value region and estimating an item value associated with the predetermined data attribute based on a similar registered form image.

~Method by Means of Item Value Estimation Model~

Figures 4A, 4B:
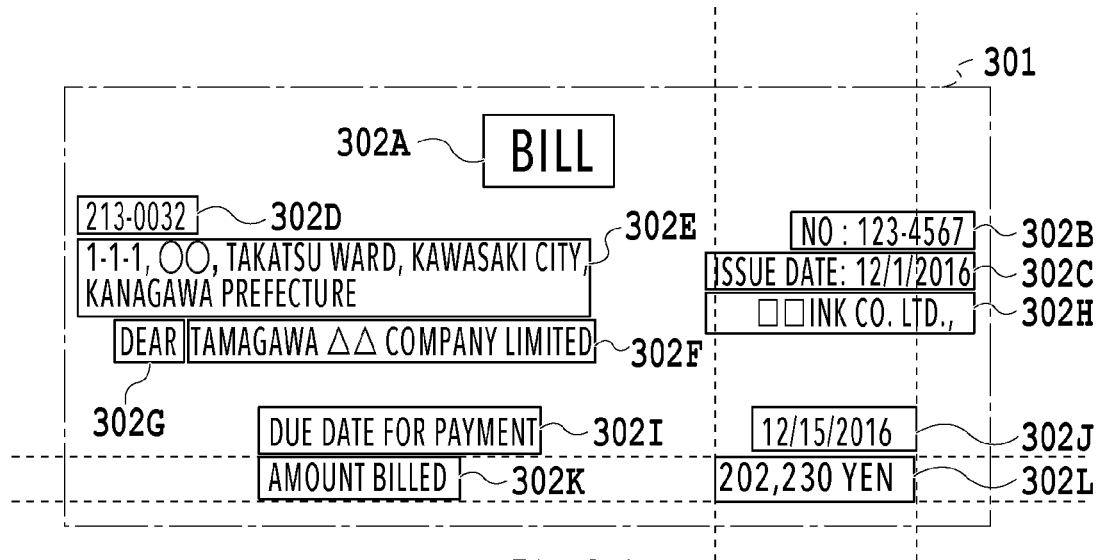
FIG. 4A is a diagram illustrating an example of item value estimation processing by means of an item value estimation model.
FIG. 4B is a diagram illustrating an example of the item value estimation processing by means of the item value estimation model.

The item value estimation processing by means of the item value estimation model is described with reference to FIGS. 4A to 4D. FIG. 4A is the same as the partial region 301 of the form image 300 illustrated in FIG. 3B and is denoted by the same numbers. Hereinafter, descriptions are given assuming that a text block 302L is a target character string in the estimation processing.

In the item value estimation processing, character string feature amount 430 illustrated in FIG. 4C is generated by using the target character string and a proximity character string to be used for the item value estimation. In order to obtain the proximity character string, eight proximity regions are set by expanding each side of a circumscribed rectangle of the target text block as illustrated in FIG. 4A. Subsequently, out of the text blocks included in each of the proximity regions, N text blocks that are close to the target text block are obtained. In this embodiment, N=3. Accordingly, a text block 302K is obtained from a direction "left" region with respect to the text block 302L as the center. Likewise, text blocks 302F, 302G, and 302I are obtained from an "upper left" region, and text blocks 302C, 302H, and 302J are obtained from a direction "top" region. Additionally, likewise, up to N text blocks are obtained from each of the regions in directions of "upper right", "right", "lower right", "bottom", and "lower left".

FIG. 4B is a word table 410 and a data type table 420 used in a case of generating the feature amount described later, and the word table 410 and the data type table 420 are both generated for the target character string and all the proximity character strings. The word table 410 includes pairs of a word included in a character string and the frequency of appearance of the word of each data attribute as elements. In this embodiment, the word is described by a character unit; however, the frequency of appearance by a word unit obtained by a morphological analysis may be used. It is also possible to use an N-gram or the like and generate the frequency of appearance according to the relationship between words that sequentially appear. On the other hand, the data type table 420 includes pairs of a regular expression of a character string and the frequency of appearance of the regular expression of each data attribute as elements. The criteria for converting into the regular expression are set for each data attribute so as to express the characteristics of the character strings. For example, for "total amount", "sequential numbers are converted into "\(yen sign)d+"". For "bill number", sequential numbers are converted as with the case of total amount, and "sequential alphabets are converted into "[A-Z]+"", additionally. For "issue date", "sequential n-digit numbers are converted into "\(yen sign)d{n}"". For "issuer", no conversion into the regular expression is performed, and the inputted character string is directly registered. The elements in each table are sorted in descending order based on the frequency of the data attribute.

FIG. 4C is a diagram illustrating the character string feature amount 430 in the target character string 302L. The character string feature amount 430 is feature amount including scores that are obtained from the words and the data types associated with each data attribute of the target character string and the proximity character string and region feature scores that are obtained from the text block.

For word scores, whether each word in the word table 410 is included in the target character string is confirmed, and the score is calculated based on the frequency of appearance. For example, in a case in which the target text block 302L is "202,230 yen", a word "," and a word "yen" in the data attribute "total amount" are included and no words included in other data attributes are included. Next, a value obtained by dividing a sum of the frequencies of appearance of each data attribute by the maximum frequency of appearance is calculated as the word score in the data attribute. In this case, the frequency of appearance of the word "," is 292, the frequency of appearance of the word "yen" is 162, and the maximum frequency of appearance of "total amount" is 328; therefore, the score is (292+162)/328=1.38. Since no words of other data attributes such as "bill number", for example, are included, the score of "bill number" is 0.0.

Subsequently, for data type scores, whether each data type in the data type table 420 is included as the data type of the target character string is confirmed, and the score may be calculated based on the frequency of appearance as with the case of the word scores. The target text block 302L includes a data type "\(yen sign)d+, \(yen sign)d+yen" of the data attribute "total amount", and the frequency of appearance of the data type is 84; therefore, 0.31 obtained by dividing the frequency of appearance by the maximum frequency of appearance, 275, is the data type score.

Finally, the region feature scores are scores obtained by dividing the appearance position of the text block by the image size. The character string feature amount is not limited to the above, and a score obtained from the size of the character string and a font parameter (size, thickness, or the like) forming the character string may be added as the region feature score of the feature amount.

FIG. 4D is a diagram illustrating an estimation result 440 of the data attributes of the text blocks. In the item value estimation processing, the probability of being associated with each data attribute is determined by means of the item value estimation model that is a learning model implemented by a regression model (AROW, SCW, or the like) capable of sequential learning and use a feature vector generated from each character string as an input. For example, for the text block 302L, a value of the probability of being associated with each data attribute is obtained as illustrated in 441 in FIG. 4D by inputting the feature amount obtained in FIG. 4C to the learning model. In this case, the data attribute "total amount" with the maximum probability, 0.73, may be outputted as the estimation result. A blank means that the probability value is 0.0.

As described above, with the learning in which the feature amount obtained from the target character string and the proximity character strings is inputted, it is possible to generate the item value estimation model in which the description rule and description pattern of the item value associated with the data attribute in the form are modeled. Thus, in a case in which the form image as the processing target is inputted, it is possible to estimate the item value and the item value region associated with the data attribute as the extraction target by means of the item value estimation model.

~Method by Means of Form Recognition Processing~

The item value estimation processing by means of the image matching processing is described with reference to FIGS. 5A to 5E.

FIG. 5A is a form image 500 including text blocks 501 to 510 obtained by the text block extraction processing in S203. FIGS. 5B and 5C are registered form images 520 and 540 that are registered in advance and include text blocks 521 to 530 and 541 to 552, respectively. Data attributes are added to some of the text blocks in the registered form images 520 and 540 in FIGS. 5B and 5C. Specifically, data attributes such as title, which represents a title of a form, issueNo, which represents a form number, issuer, which represents a company name of an form issuer, and issuerTel, which represents a phone number of the form issuer company are added to the ID 521, ID 522, ID 523, and ID 524, respectively. In this example, form issue date (issueDate), sub total (subTotal), and total (total) are added as other data attributes; however, still other data attributes may be added.

First, with the form recognition processing, a registered form image that is similar to the form image as the processing target is identified out of the registered form images registered in advance. Specifically, a registered form image that is more similar to the form image 500 as the processing target in the shapes and the arrangement of text blocks is identified out of the registered form images 520 and 540 to which the data attributes are added. In this case, the registered form image 520 is identified as the similar registered form image.

Subsequently, based on the text block to which the data attribute associated with the similar registered form image 520 is added, a corresponding text block is estimated in the form image 500, and thus the item value region and the item value associated with the data attribute are estimated. Specifically, the text block 522 illustrated in FIG. 5B to which the issueNo attribute is added is projected onto the same position on the registered form image 500 illustrated in FIG. 5D. Then, a text block proximal to the projected text block 563 is searched for, and the ID 502 and the ID 503 are obtained. Then, the similarity between the form image 500 and the registered form image 520 in a case in which the positions of the ID 563 and the ID 502 are aligned and the similarity between the form image 500 and the registered form image 520 in a case in which the positions of the ID 563 and the ID 503 are aligned are calculated. As a result, with the alignment with the ID 502, the ID 522, the ID 523, and the ID 524 come close to the ID 502, the ID 503, and the ID 504, respectively, and a high similarity is obtained. Therefore, the issueNo attribute is added to the ID 502. The processing is similarly executed on the text blocks to which other data attributes are added, and thus the estimation result of the item value (character string) associated with the data attribute is obtained as illustrated in FIG. 5E. If multiple item value regions associated with one data attribute are extracted, an item value region having the maximum similarity in the position alignment may be outputted.

As described above, the prior registration of the item value region positions as an already-known pattern in the form image registered in advance allows for the estimation of the item value region positions associated with the data attributes once a similar form is inputted.

<Confirmation Screen>

A confirmation screen of the item value estimation result of the processing on the form image 300 and a confirmation operation by the user in S205 in FIG. 2 are described with reference to FIGS. 6A and 6B.

Figures 6A, 6B:
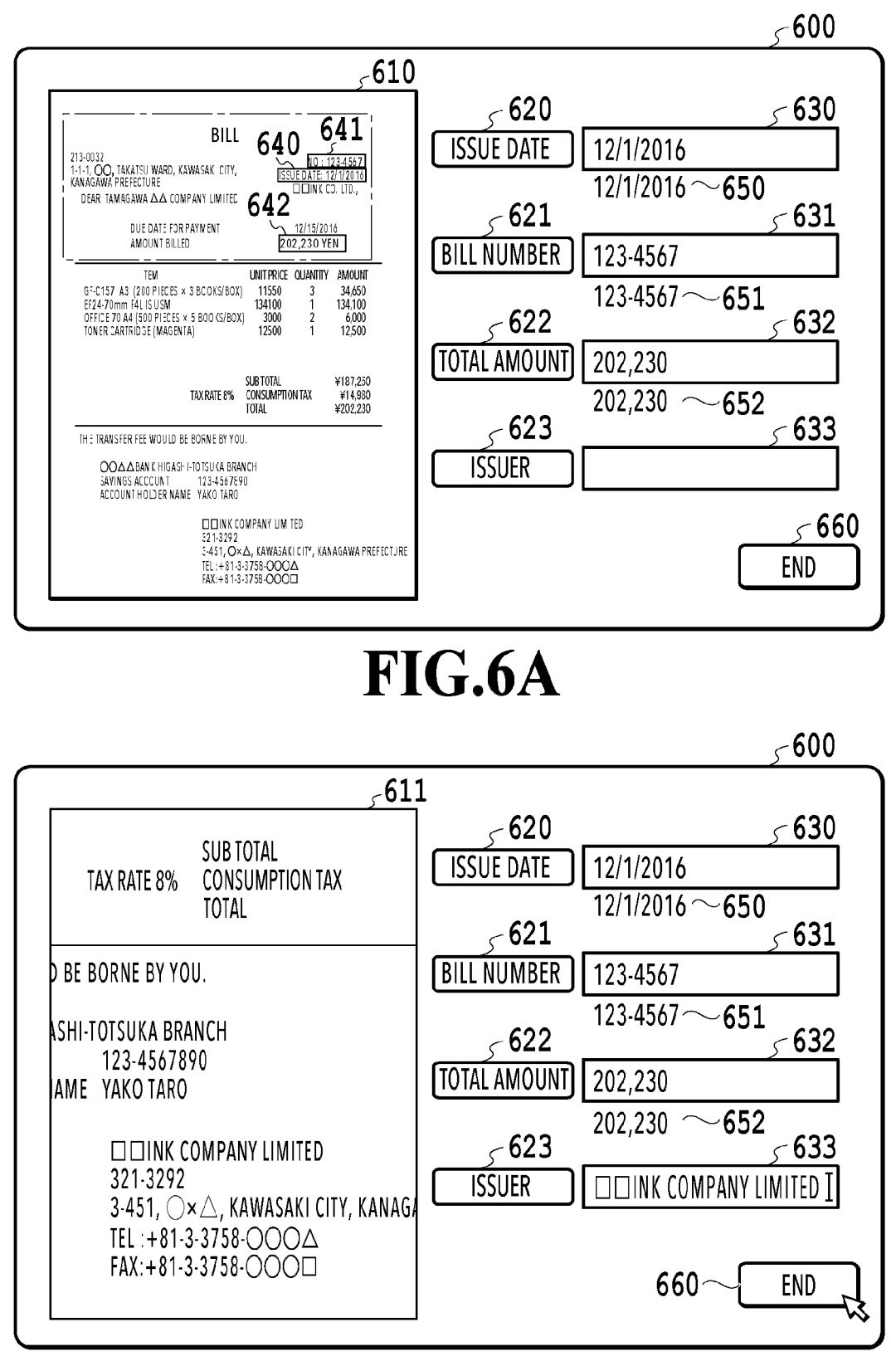

A confirmation screen 600 illustrated in FIG. 6A includes a preview image 610, data attribute display boxes 620 to 623, item value display boxes 630 to 633, item value regions 640 to 642, item value region images 650 to 652, and an end button 660.

The preview image 610 is an image that is an entire region or a partial region cut from the form image 300. The user is able to change the display range and the display scale of the preview image by performing operations of swipe and pinch-in and pinch-out on the preview image 610.

The data attribute display boxes 620 to 623 each display the name of the data attribute as the extraction target by the data input assistance system in this embodiment. On the confirmation screen 600, issue date, bill number, total amount, and issuer are displayed in the data attribute display boxes 620 to 623, respectively.

The item value display boxes 630 to 632 each display the item value associated with the data attribute. The item value obtained in S204 is displayed in the corresponding one of the item value display boxes 630 to 632. The blank item value display box 633 indicates that the extraction of the item value has failed. The user can confirm the texts displayed in the item value display boxes 630 to 633 and can perform addition and modification on the texts as needed. Specifically, in a case of inputting an item value into the item value region 633, it is possible to display a preview image 611 in FIG. 6B by operating on the preview image so as to check the place in which an item value is displayed. Then, it is possible to input a correct item value into the item value display box 633 by checking the preview image. In a case in which an item value is inputted into an item value display box by the user, a text block matching a character string as the item value may be detected from the form image, and the region in which the thus-detected text block is positioned may be used as the item value region. Otherwise, the user may use a pointer on the preview image 610 so as to designate a text block to be used as the item value region.

The item value regions 640 to 642 are image regions on the preview image 610 that correspond to the item values inputted to the item value display boxes 630 to 632 and are displayed with a highlight on the preview image 610. It is possible to apply a configuration to control that, once any one of the item value display boxes is selected, a corresponding item value region is enlarged and displayed in the center of the preview image.

The item value region images 650 to 652 are images in which the item value regions 640 to 642 displayed with a highlight on the preview image 610 are cut out and displayed. The user can easily confirm whether the character recognition is performed properly by comparing the item value region images 650 to 652 with the item values inputted in the item value display boxes 630 to 632.

The end button 660 is a button to terminate the confirmation screen 600. The user may terminate the confirmation and modification operation of the item value using the confirmation screen 600 by pressing the end button 660.

<Reference Information Update Processing>

The reference information update processing executed in S207 in FIG. 2 is described with reference to FIG. 7.

In S701, the CPU 111 obtains correct answer data including the data attribute and the item value that are confirmed/modified by the user in S205 from the data attribute display boxes and the item value display boxes on the confirmation screen 600.

In S702, the CPU 111 obtains the data attribute that is not processed yet from all the data attributes obtained in S701.

In S703, the CPU 111 obtains the character string as the item value associated with the data attribute obtained in S702.

In S704, the CPU 111 searches the form image 300 for the character string as the item value obtained in S703 and extracts the text block including the obtained character string as the item value. In this process, the character strings included in all the text blocks as the OCR processing result obtained in S203 and the character string as the item value obtained from the item value display box on the confirmation screen 600 may be compared with each other, and a text block including the matched character string may be extracted.

In S705, the CPU 111 associates the data attribute with the text block information (item value information) including the position and the character string of the text block extracted in S704 and saves the correct answer data as learning data or a registered form image.

In S706, the CPU 111 determines whether all the data attributes as the extraction target are processed. If there is a data attribute not processed yet, the process returns to S702, and if all the data attributes as the extraction target are processed, the process proceeds to S707.

Finally, in S707, the CPU 111 executes the reference information update processing based on the learning data or the registered form image that are the correct answer data indicating the correspondence relationship between the data attribute and the item value saved in S705 and the item value information in the OCR processing result obtained in S203.

Specifically, in the case of the item value estimation processing by means of the item value estimation model illustrated in FIGS. 4A to 4D, first, the frequency information in the word table 410 and the data type table 420 illustrated in FIG. 4B is updated. Thereafter, the character string feature amount for all the text blocks may be generated as illustrated in FIG. 4C, and the item value estimation model that executes the item value estimation may perform learning again based on the newly generated character string feature amount.

On the other hand, in the case of the item value estimation processing by means of the registered form image illustrated in FIGS. 5A to 5E, the text block information (item value information) obtained in S203 and the character string saved in S705 are associated with each other, and a new registered form image is generated to be registered. This makes it possible to use the new registered form image reflecting the modification result by the user in the next processing. Otherwise, the position of the text block in the registered form image saved in S705 may be estimated, and a new data attribute may be added to the text block in the already-existing registered form image to update the registered form image.

In S701, learning a form that has failed in extraction may be prioritized by executing the reference information update processing at and after S702 while obtaining only a part modified by the user but not obtaining a part that is not modified and only confirmed. Additionally, if there is one text block detected as a result of searching for the character string as the item value associated with the data attribute that is not modified by the user in the processing in S704, the detected text block may be excluded from the update processing. This makes it possible to efficiently learn and register a rule and a pattern that have failed in extraction. Additionally, needless to say, it is also possible to set only a specific form image and a specific data attribute determined in advance as the target of the reference information update processing.

According to the above-described processing flow, in this embodiment, it is possible to extract all the text blocks each including the character string as the corresponding item value associated with each data attribute out of the entire form image by using the confirmation/modification result by the user and to associate the thus-extracted text blocks with the data attributes. This allows for the update of the reference information such as a new description rule and appearance pattern of the data attribute and the item value without time and effort of the user to select all the item value regions. Additionally, since it is possible to learn and register comprehensively a description rule and an appearance pattern in which item values in various described positions are associated with the data attributes, the possibility of the extraction of the item values can be enhanced.

Second Embodiment

In this embodiment, during the processing of searching for an item value region (text block) to be newly associated with the data attribute as the extraction target in the form image, the fluctuation of character string descriptions and the probability of being as the item value region are taken into consideration. Consequently, in this embodiment, it is possible to learn and register only learning data and a registered form image that have a good quality and are likely to be a correct answer in the first embodiment.

<Learning Data Update Processing>

The learning data update processing in this embodiment is described with reference to FIGS. 7 and 8A to 8C.

Figure 7:
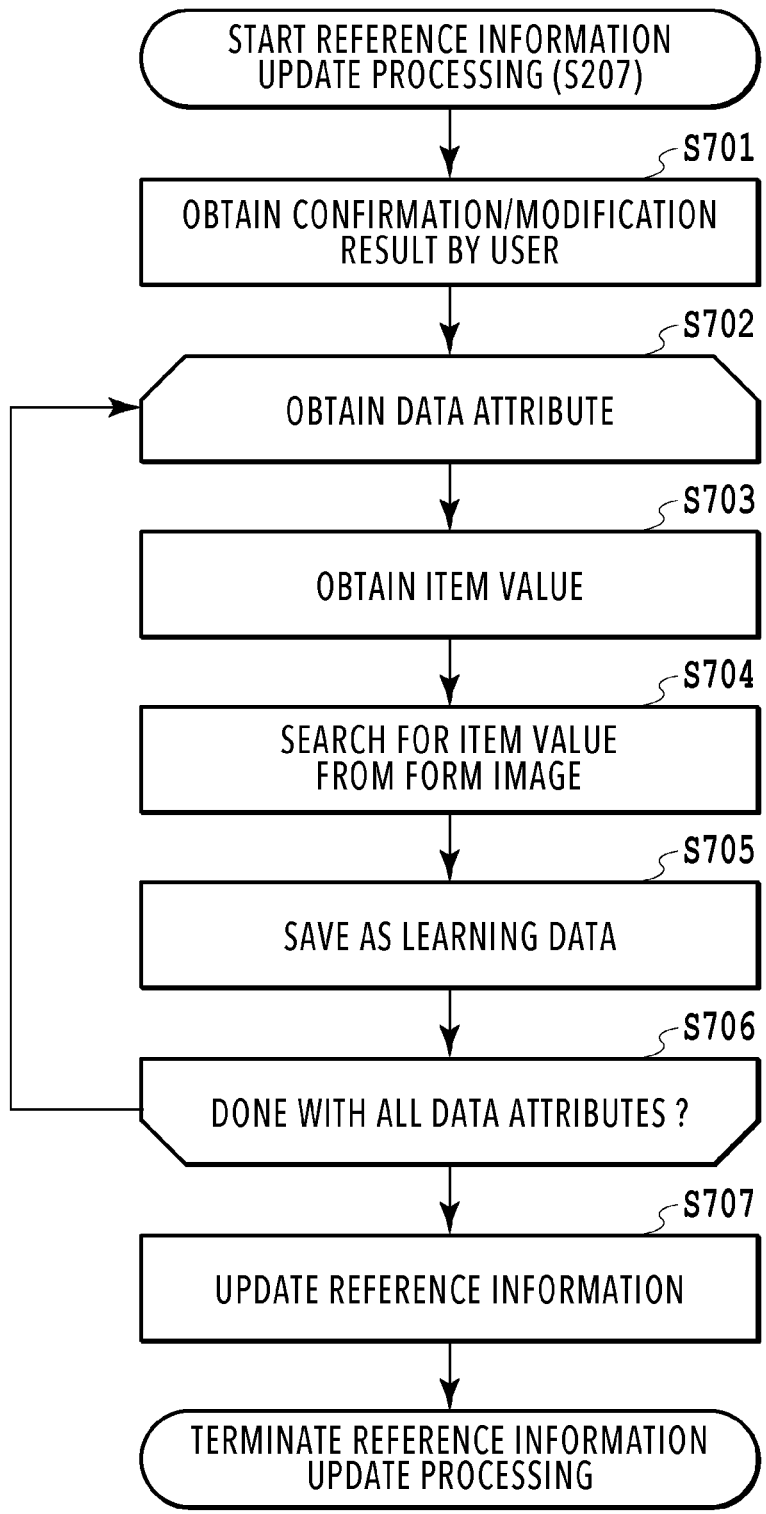
FIG. 7 is a diagram illustrating an example of a flow of reference information update processing.

As with the first embodiment, in S704 in FIG. 7, the CPU 111 searches the form image 300 for the character string as the item value obtained in S703. In this embodiment, the comparison between the character strings included in all the text blocks obtained in S203 with the character string as the item value obtained in S703 is not performed depending on a fully matching thereof, but the comparison is performed taking into consideration the fluctuation of character string descriptions and the probability of being as the item value region based on predetermined criteria.

First, even if the character strings have the same meaning, the character strings may not be fully matched with each other depending on how they are described. For example, as illustrated in FIG. 8A, for the data attribute "total amount" in the form image 300, it is described as "202,230 yen" in a text block 801 but is described differently as "\(yen sign)202,230" in a text block 802. Additionally, for "issuer name", it is described as "Yako Ink Company Limited" in a text block 805 but is described in the abbreviated form as the "Yako Ink Co., Ltd" in text blocks 803 and 804.

In order to take into consideration such fluctuation of character string descriptions, the descriptions of the character strings included in all the text blocks and the description of the character string as the item value are uniformed based on a predetermined rule as illustrated in FIG. 8B. Then, as illustrated in FIG. 8C, character strings after the conversion from the character strings included in the text blocks into the uniform description and a character string after the conversion from the character string as the item value into the uniform description are compared with each other. This makes it possible to prevent failing of the extraction due to the fluctuation of the descriptions of the character strings. The rule of the uniform description is assumed to be registered in advance; however, it is also possible to acquire a unique rule of the uniform description by the user based on the character strings before and after the conversion during the confirmation/modification by the user in S205 in FIG. 2.

Subsequently, the probability of being as the item value is determined based on whether the item value region extracted as described above satisfies predetermined conditions. The text blocks 803 and 805 in FIG. 8A are described as a character string used alone since there are no text blocks subsequent thereto. On the other hand, the text block 804 is described with subsequent text blocks arranged before and after, and therefore the text block 804 can be estimated as a character string as a part of a sentence. Since such a character string included as a part of a sentence is hardly used as the item value, the character string may be excluded from the candidates of the item value region. The determination on the probability of being as the item value is not limited thereto, and a character string used as a part of a diagram such as a graph and an illustration and a character string described with characters significantly smaller than that of other character strings in the form image by a predetermined magnification or less may be excluded from the candidates because those character strings do not have the probability of being as the item value.

As described above, in a case of searching for the item value text modified/confirmed by the user in the form image, it is possible to update the item value estimation unit by using the item value region that is narrowed down by taking into consideration the fluctuation of the descriptions and the probability of being as the item value based on a predetermined criteria. Consequently, it is possible to inhibit a failure of extraction and wrong extraction of the item value in the item value estimation processing.

Third Embodiment

In this embodiment, a system, for a case in which multiple item value regions (text blocks) are obtained in the item value estimation processing, to estimate a proper item value by selecting an optimum text block while taking into consideration a display history of the user is provided.

Figure 9:
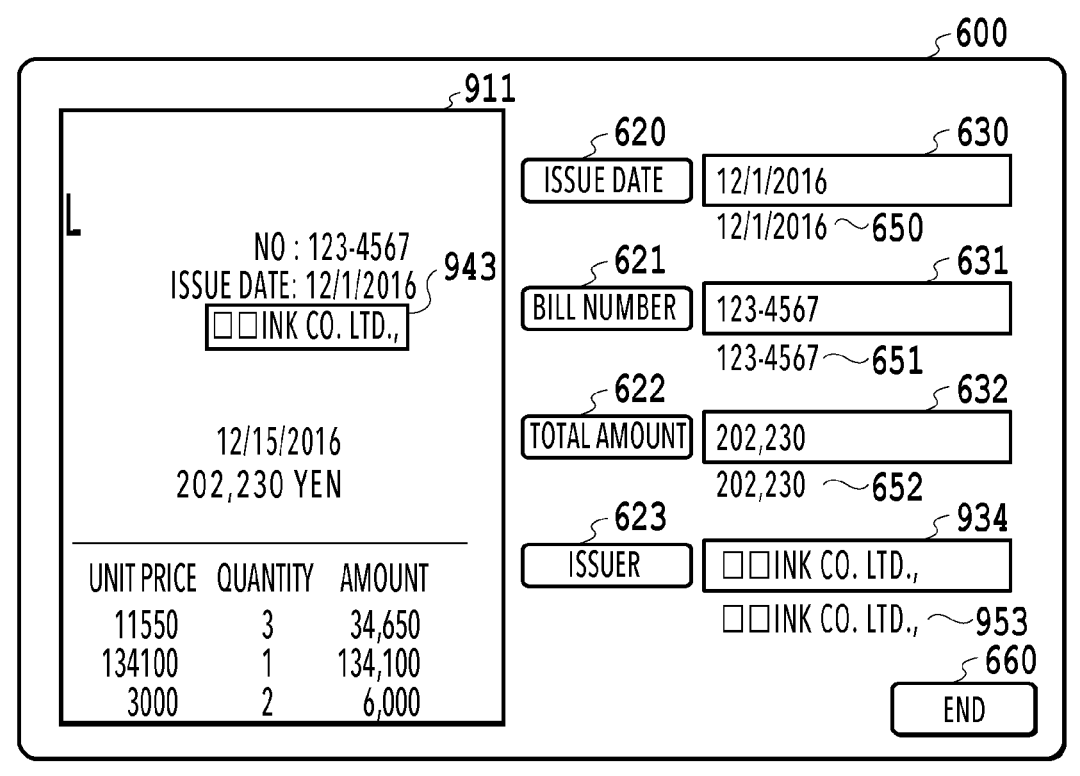

In S701 in FIG. 7 in the first embodiment, only the data attribute and the character string as the item value inputted are obtained from the confirmation screen 600 to be used for the reference information update processing. Therefore, even if multiple text blocks including the character string as the item value obtained in S703 are detected in S704, all the text blocks are treated equally. For this reason, in the next processing, a text block in a position that is different from the region enlarged and displayed to be confirmed by the user for the modification in FIG. 6B may be selected in some cases. For example, a preview image 911 including an item value region 943 may be displayed as illustrated in FIG. 9, and "Yako Ink Co., Ltd." may be displayed in an item value input box 934 as the character string as the item value.

To deal with this, in this embodiment, in a case of obtaining the correct answer data as a result from the confirmation/modification by the user in S701, position information on the preview image 611 illustrated in FIG. 6B that is displayed while the user modifies the character string as the item value is also obtained as the item value information.

In the following S705 in which the learning data or the registered form image is added, whether each text block detected in S704 is included in the preview image is determined based on the position information on the preview image, and the determination result is added to the learning data or the registered form image as display history information and saved. If multiple text blocks are included in the preview image, one text block may be determined by narrowing down the text blocks to the one text block considered to be desired by the user based on predetermined determination criteria such as the display position and the display size in the preview image.

In S707, the reference information used for the item value estimation is updated by using the learning data or the registered form image to which the information indicating whether it is the text block desired by the user is added. Specifically, in the case of the item value estimation processing illustrated in FIGS. 4A to 4D, a display history score indicating whether the user has enlarged and displayed an item value region for the confirmation/modification of the item value is added to the character string feature amount illustrated in FIG. 4C. That is, 1.0 is added as the display history score if there is included an item value region in the preview image that is enlarged and displayed by the user for the confirmation/modification of the item value, and 0.0 is added as the display history score if there is included no item value region. Then, the learning model may perform the learning again to update the reference information. On the other hand, in the case of the item value estimation processing illustrated in FIGS. 5A to 5E, as with the first embodiment, an update is made by adding a corresponding data attribute to each text block in the similar registered form image and additionally adding display history information indicating the number of times of display to each text block. This display history information indicating the number of times of display is information indicating the number of times of display of the preview image that is displayed by the user. If multiple text blocks are obtained as the candidates in the item value estimation processing, the most displayed text block may be selected based on this display history information.

Also in the case of the item value estimation processing illustrated in FIGS. 4A to 4D, the display history score indicating the number of times of display of the preview image that is displayed by the user may be added to the character string feature amount, and the learning model may perform the learning again. Additionally, also in the item value estimation processing illustrated in FIGS. 5A to 5E, the display history information indicating whether the user has enlarged and displayed an item value region for the confirmation/modification of the item value may be added to the text blocks to select a text block based on the display history information.

With the above-described processing, it is possible to enhance the estimation accuracy of the item value estimation processing by adding information on the item value region displayed by the user for the confirmation/modification of the item value as a part of the reference information. Consequently, even in a case in which there are estimated multiple item value regions for one data attribute in a form, it is possible to narrow down the multiple item value regions to obtain an item value region desired by the user and present the item value region as the estimation result.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the technique of the present disclosure, it is possible to associate an item value with a data attribute without individually designating an item value associated with the data attribute by a user.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-215546 filed Dec. 24, 2020, which is hereby incorporated by reference wherein in its entirety.

What is claimed is:

1. An information processing system, comprising:
   at least one memory that stores instructions; and
   at least one processor that execute the instructions to:
   obtain a scanned image obtained by scanning an original document;
   execute character recognition processing on text blocks which are extracted from the scanned image, the text blocks indicating regions of character attributes;
   estimate a text block including a character string associated with a predetermined data attribute out of the text blocks;
   control a display device to display the scanned image and the character string included in the estimated text block; and
   update, if the displayed character string is modified by a user, reference information based on the modified character string and display history information which indicates that a text block including the modified character string has displayed on the display device while the displayed character string is modified by the user, wherein the updated reference information is used such that the text block including the modified character string is to be estimated as a text block including a character string associated with the predetermined data attribute.

2. The information processing system according to claim 1, wherein
   the at least one processor estimates the text block including the character string associated with the predetermined data attribute by using a learning model, wherein the updated reference information include character string feature amount of the modified character string and the display history information, and wherein the learning model performs learning based on the updated reference information.

3. The information processing system according to claim 1, wherein
   the at least one processor identifies a registered image in which positions of text blocks are similar to that in the scanned image out of a plurality of registered images that each indicate a position of a text block including a character string associated with the predetermined data attribute, and estimates the text block including the character string associated with the predetermined data attribute based on the similar registered image, wherein the plurality of registered images are updated based on the updated reference information.

4. The information processing system according to claim 1, wherein
   if there are a plurality of text blocks including a character string matching the modified character string, the at least one processor selects one from the plurality of text blocks based on the display history information.

5. The information processing system according to claim 1, wherein
   the predetermined data attribute includes at least one of a title of the original document, an identification number of the original document, an issuer of the original document, a phone number of the issuer, an issue date of the original document, sub total, and total.

6. An information processing method, comprising:
   obtaining a scanned image obtained by scanning an original document;
   executing character recognition processing on text blocks which are extracted from the scanned image, the text blocks indicating regions of character attributes;
   estimating a text block including a character string associated with a predetermined data attribute out of the text blocks;
   controlling a display device to display the scanned image and the character string included in the estimated text block; and
   updating, if the displayed character string is modified by a user, reference information based on the modified character string and display history information which indicates that a text block including the modified character string has displayed on the display device while the displayed character string is modified by the user, wherein the updated reference information is used such that the text block including the modified character string is to be estimated as a text block including a character string associated with the predetermined data attribute.

7. A non-transitory computer-readable storage medium storing a program to cause a computer to execute an information processing method, comprising:
   obtaining a scanned image obtained by scanning an original document;
   executing character recognition processing on the extracted text blocks which are extracted from the scanned image, the text blocks indicating regions of character attributes;
   estimating a text block including a character string associated with a predetermined data attribute out of the text blocks;
   controlling a display device to display the scanned image and the character string included in the estimated text block; and
   updating, if the displayed character string is modified by a user, reference information based on the modified character string and display history information which indicates that a text block including the modified character string has displayed on the display device while the displayed character string is modified by the user, wherein the updated reference information is used such that the text block including the modified character string is to be estimated as a text block including a character string associated with the predetermined data attribute.

* * * * *